(No Model.)
H. A. GOLL.
OVAL ANGULAR VALVE.
No. 386,462. Patented July 24, 1888.
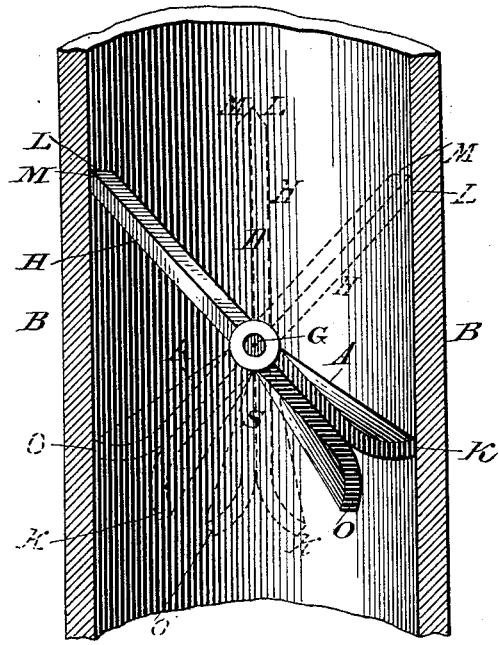
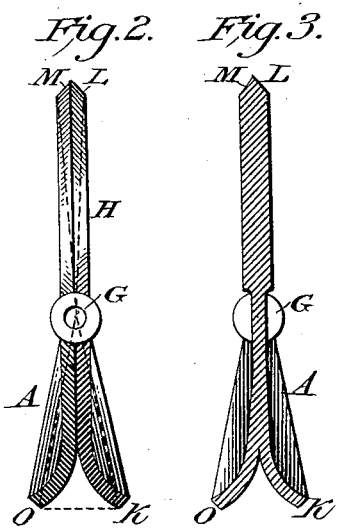
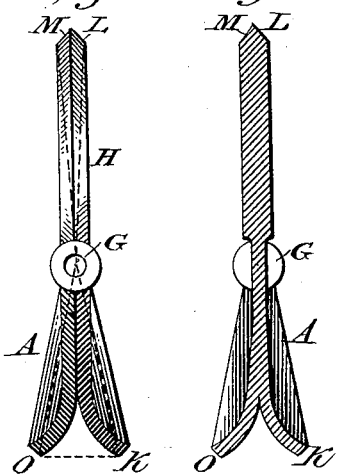
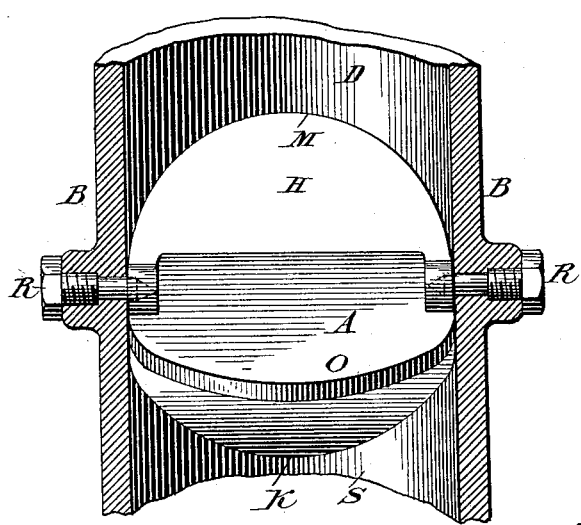
Witnesses.
Albert H. Rice.
William H. Goll
Inventor:
Henry A. Goll.

UNITED STATES PATENT OFFICE.

HENRY A. GOLL, OF CHICAGO, ILLINOIS.

OVAL ANGULAR VALVE.

SPECIFICATION forming part of Letters Patent No. 386,462, dated July 24, 1888.

Application filed July 21, 1887. Serial No. 244,957. (No model.)

*To all whom it may concern:*

Be it known that I, HENRY A. GOLL, a citizen of the United States, residing at 338 West Van Buren street, in the city of Chicago, in the county of Cook and State of Illinois, have invented a new and useful Improvement in Swinging Oval Angular Valves, for which I applied for Letters Patent in the United States, being an improvement on my invention the application for which was filed March 30, 1887, Serial No. 233,091, of which the following is a specification.

My invention relates to an improvement on the single-seated swinging oval angular valve in such a manner as to leave off the pin W in the pipe B; also to prevent the valve from knocking against the pipe, which may cause a break; further, that the pipe in which the valve is hung can be in a slanting, horizontal, or perpendicular position, &c.

My invention consists of a peculiarly-constructed valve, hereinafter described, and which is arranged in such a manner that it will open automatically to any pressure from one side, S, and to any suction from the other side, D, of the pipe in which the valve is hung in the center thereof, and that it will close the pipe again likewise automatically when the pressure from the first-named side, S, or the suction on the second-named side, D, has ceased.

My invention further consists in a valve to be used in a circular pipe as ordinarily in use therefor, not necessitating the laborious task of making a square pipe or passage; likewise the equally laborious task of fitting a square or rectangular valve to said pipe, such as have been used prior to my invention. Such rectangular valves would either get wedged (when the pipe was to be opened or closed) against the sides of said square pipe, or not fit said pipe well and firm enough when closed.

My invention consists, broadly, in a swinging oval double angular valve, to be used in circular cylinder-pipes, as ordinarily in use. The valve is automatic when fitted and hung in the center of said pipe. It will allow steam or fluids of any kind to go only one way from S toward D, and prevent anything from going the other way, D toward S. The valve, being angular and oval, is easily fitted and will not get wedged against the sides of the pipe, &c.

To give a better understanding of my invention, I have marked corresponding parts with similar letters, and of which I will now give a detailed description, reference being had to the accompanying drawings, and to the letters of reference marked thereon, making a part of this specification, in which—

Figure 1 is a side view of the valve in a longitudinal section of a circular cylinder-pipe, showing the different positions of the valve when the pipe is closed in solid lines, and when the pipe is open in dotted lines. Fig. 2 is a side view of the valve, showing the two angular seats crossing each other, &c. Fig. 3 is a sectional side view of the valve, showing the wing H heavier than the wing A. Fig. 4 is a detailed view of the valve, showing parts of the oval angular seats, &c. Fig. 5 is a front view of the valve in a longitudinal section of a circular pipe, showing part of one and part of the other oval angular seats; also the position of the valve when open, showing it also hung by means of the set-screws R, a section of the valve around the bearing being removed.

B, Figs. 1 and 5, represents longitudinal sections of a circular pipe. The part of said pipe which the valve is fitted to is a cylinder of the same diameter, and the valve is hung diametrically therein by means of the set-screws R, and fitted in such a manner that it will swing freely on the bearing and swinging point G. The valve must also be fitted to the pipe when said pipe is closed by means of said valve, that the wings are in a slanting position with the bore of the pipe, and if the pipe is in a vertical position the wing H must be above the bearing G and the wing A below the bearing G, whether said pipe is open or closed. It must also be fitted to close the pipe well, so as not to allow anything to pass from D toward S. At the same time the valve must open the pipe freely to any pressure, whether weak or strong, coming from S. The valve, as shown on the drawings, is double angular. The points M G K are in an obtuse angular position, and the points L G O are in an obtuse angular position, which causes the valve, when fitted to the circular pipe and hung as mentioned, to have an oval form. The wings will be of different lengths from the bearing G.

They will have a different area and a different shape.

The wing H is a straight piece of plate of about an even thickness. The wing A, however, by being shorter than the wing H, and the valve by being hung diametrical in pipe, would not close said pipe unless the seat of said wing A was in advance toward the side of the pipe to that on the wing H.

If the wing A were straight from G to K, from K to O, and O to G again, as shown in dotted lines, Fig. 2, said wing would be too heavy if solid, and as the wing A must be less in weight than the wing H the wing A can be reduced in weight, either on the outside, as shown in Fig. 2, or by making it thinner, as shown in Fig. 3, or by coring it in a suitable manner between the acute angle. (Shown in dotted lines, Fig. 2.) It is essential to the successful carrying out of my invention that said wing A must be less in weight, shorter, and have a smaller area than the wing H. The valve must have the beveled oval obtuse angular seats. It must be hung and arranged, in combination with the pipe and set-screws, so that the valve will swing open and close the pipe, as herein described, and when the pipe is closed by means of the valve the valve must prevent anything from going from D toward S. The valve being hung diametrical in said pipe, and the wing A always being longer than one-half of the diameter of the pipe, and the wing H being still longer, and the wings being in a slanting position with the bore of said pipe when the pipe is closed the wings will have beveled edges. Said beveled edges are all around the edge of the valve, except at G, and, as shown on the drawings, they are in opposite directions to each other, and the diagonally-opposite beveled edges M K and L O are parallel to each other, and are also oval obtuse angular, (M G K and L G O, shown on the drawings,) the double oval angular-seated valve having the wings of unequal length and area and an oval form, Figs. 4 and 5.

The double angular valve, having an oval form, Fig. 5, and the beveled edges, will open the pipe freely to any pressure from S, it cannot get wedged against the pipe, and will fit the pipe close, for the purpose herein described.

The valve, when constructed, arranged, and hung as described, and the pipe being in a position that the set-screws R are horizontal, or nearly so, with each other, will close the pipe and keep it closed by its own weight, whether said pipe is in a slanting, horizontal, or vertical position, (with the wing H upward,) until opened by a pressure coming from S. The valve has two seats. The beveled edges constitute those seats. One of those seats, as shown on the drawings, is on the left side of the wing H, and turns or changes at G to the right side of the wing A. (M G K.) The other seat is on the right side of the wing H, crosses the first-named seat at G and to the left side of the wing A. (L G O, shown in Figs. 2, 4, and 5.)

When there is a pressure of steam, &c., coming from S toward the valve, said steam, acting against both wings H and A, will compel the larger wing, with its increased area, to turn toward D and the center of the pipe B, and the smaller one, being overpowered by the larger one, will turn toward S and the center of the pipe, and the valve will be in the position with the pipe, as shown in Fig. 1 in dotted lines, thereby causing two passages, narrower toward S than toward D. They are caused of that shape by the valve remaining in the pipe. The steam will then pass through said passages and around the valve and finally out at D. As soon as said pressure has ceased, the valve will close those passages again by its own weight.

The valve, when constructed as herein described, will answer all the purposes, no matter how the wing A is shaped, Figs. 2 and 3; neither does it require any certain degree of obtuse angles.

To construct the valve properly, it is only necessary that the points M G K are in an obtuse angular position; also the points L G O in an obtuse angular position. G must be the swinging point, also the crossing-point of the two seats. The distances from G to M and from G to L must be greater than the distances from G to K and from G to O. The distance from K to O must also be more than from M to L. (All shown in dotted lines, Fig. 2.) The wing H must be heavier than the wing A, and the valve must be hung in, arranged, and fitted to said pipe, as herein described, which will cause the valve to be an automatic double oval angular-seated valve for a circular cylinder pipe or passage, and which will allow a pressure of steam, &c., to go only one way, from S toward D, and prevent anything from going the other way—D toward S.

The valve herein described, when hung in a pipe and said pipe being closed, a sudden pressure of steam coming from S would cause the valve to open the pipe with impetus, and as the valve is a swinging valve it would have a tendency to knock against the opposite side of the pipe from that upon which it rested. It is prevented from so doing by the steam passing through the two passages, which counteracts this impetus as soon as the valve gets beyond the position shown on the drawings in dotted lines, Fig. 1.

Operation: To show and explain the operation of the double angular valve in a pipe, for instance. The valve being placed in an exhaust-pipe of a locomotive or steam engine, with the wing H toward the nozzle, will close and keep the pipe closed by means of its own weight, no matter in what position the pipe is in. As soon as the engine is set in motion by means of its own steam, the exhaust-steam coming from the cylinder will flow toward the nozzle, which is upward and open, and is situated in the smoke-arches of locomotives and many steam-engines. Said exhaust-steam on its way will come against the valve, the valve will open the pipe, as it has the wings of different area, the steam will pass around the valve through the two passages, and finally out at the exhaust-nozzle. When the exhaust has ceased to flow toward the nozzle, the valve will close the pipe again by means of its own weight and one of the beveled oval angular seats, and prevent ashes, cinders, &c., which can fall in said nozzle, (and which are drawn in by the suction of the piston in the cylinder at present,) from going farther toward the cylinder than where the double oval angular-seated valve is hung, thereby preventing the wearing of the slide-valve, the valve-seat, piston, cylinder, &c., by means of said ashes, cinders, &c. The valve being automatic, requires no handling or watching, but will adjust itself to the pipe for the above purpose.

Having thus fully described my invention, what I claim, and desire to secure by Letters Patent, is—

1. The swinging double oval angular-seated valve, being oval, double angular, automatic, hung diametrical in a circular cylinder-pipe, fitting the pipe, and having the wings H and A, of unequal length, shape, size, weight, and area, substantially as described, and for the purpose as specified.

2. The swinging double oval angular-seated valve having the beveled oval angular seats M G K and L G O, and the swinging and crossing bearings G of the two oval angular seats, substantially as described, and for the purpose as specified.

3. The combination of the swinging double oval angular-seated valve, constructed and arranged as herein described, with the circular cylinder part of pipe B, the set-screws R, and the passages controlled by the valve, substantially as described, and for the purpose set forth in the specification.

HENRY A. GOLL.

Witnesses:
HILAND E. PITCHER,
WILLIAM O. EASTERLY.